United States Patent [19]

Daly et al.

[11] Patent Number: 5,404,455
[45] Date of Patent: Apr. 4, 1995

[54] TIME DIVISION MULTIPLEXER CHIP FOR SUPPORTING ALTERNATING COMMUNICATION BETWEEN A PAIR OF RAMS AND TWO DIFFERENT INTERFACES

[75] Inventors: Daniel F. Daly, Monroe; John J. Dwyer, Stratford; Salvatore J. Morlando, Easton; Mark Sekas, Orange; Shamla V. Sharma, Norwalk; Judith Dixon-Otton, Waterbury, all of Conn.

[73] Assignee: Dictaphone Corporation, Stratford, Conn.

[21] Appl. No.: 816,404

[22] Filed: Dec. 31, 1991

[51] Int. Cl.⁶ .............................................. G06F 15/02
[52] U.S. Cl. ..................... 395/275; 395/325; 395/250; 364/221.5; 364/238.1; 364/239.5; 364/DIG. 1
[58] Field of Search ......... 395/275, 250, 325; 364/239.5, 239.51, 939.1, 939.81, 939.7, 221.5, 238.1

[56] References Cited

U.S. PATENT DOCUMENTS

| | | | |
|---|---|---|---|
| 3,772,657 | 11/1973 | Marsalka et al. | 395/575 |
| 4,298,954 | 11/1981 | Bigelow et al. | 364/900 |
| 4,442,485 | 4/1984 | Ota et al. | 364/200 |
| 4,549,047 | 10/1985 | Brian et al. | 364/200 |
| 4,602,331 | 7/1986 | Sneth | 364/200 |
| 4,785,473 | 11/1988 | Pfeiffer et al. | 379/89 |
| 4,799,144 | 1/1989 | Parruck et al. | 364/200 |
| 5,031,146 | 7/1991 | Umina et al. | 365/189.01 |
| 5,130,975 | 7/1992 | Akata | 370/60 |
| 5,163,132 | 10/1992 | DuLac et al. | 395/275 |

FOREIGN PATENT DOCUMENTS

| | | |
|---|---|---|
| 0323248 | 12/1988 | European Pat. Off. |
| 0437515 | 4/1990 | European Pat. Off. |
| 92311854 | 9/1994 | European Pat. Off. |

Primary Examiner—Thomas C. Lee
Assistant Examiner—Moustafa M. Meky
Attorney, Agent, or Firm—Ronald Reichman; Melvin J. Scolnick

[57] ABSTRACT

A time division multiplexer (TDM) chip having particular application in a digital voice processing system wherein voice processing functions are run in software. The TDM chip has a pair of RAMs which are in communication with a bus and at least one interface that provides communication with other devices. An bank switch controls the RAMs so that their communication with the bus and the interface alternates, i.e. while the first RAM is in communication with the interface the other RAM is in communication with the bus. After a determined period the communications are reversed. This scheme provides faster processing and more efficient use of the components. Including is a provision for allowing multiple interfaces to communicate with the RAM alternatively in a time shared manner.

8 Claims, 11 Drawing Sheets

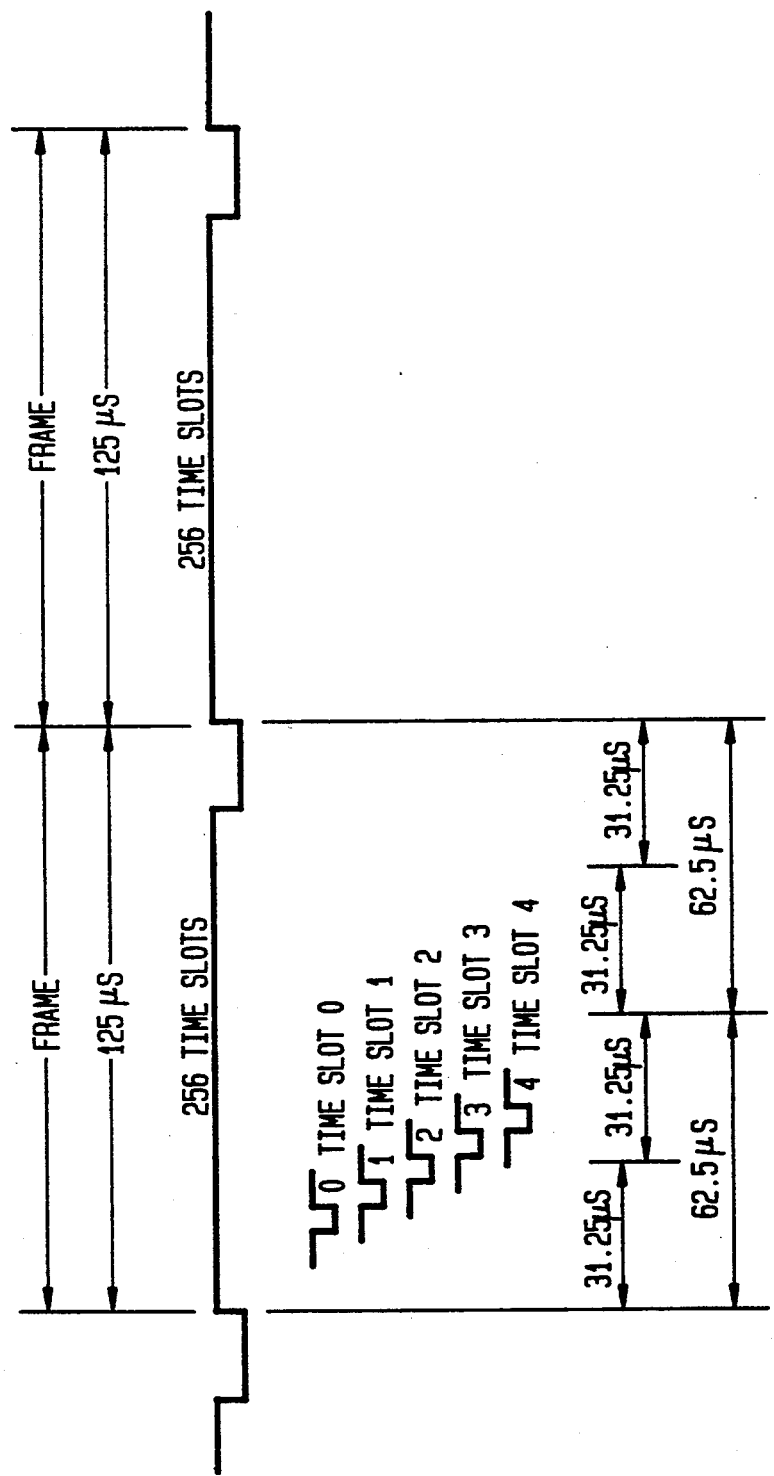

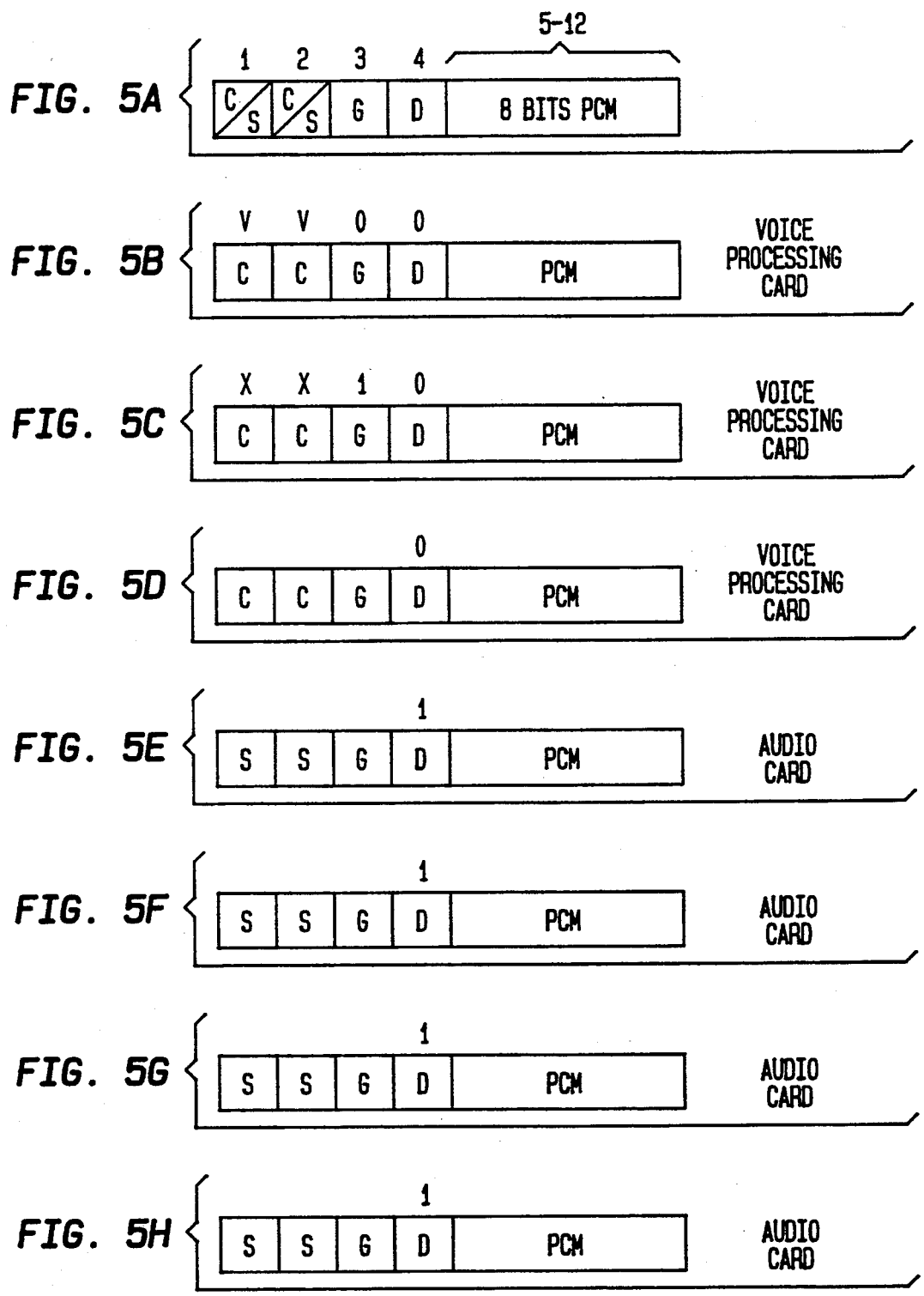

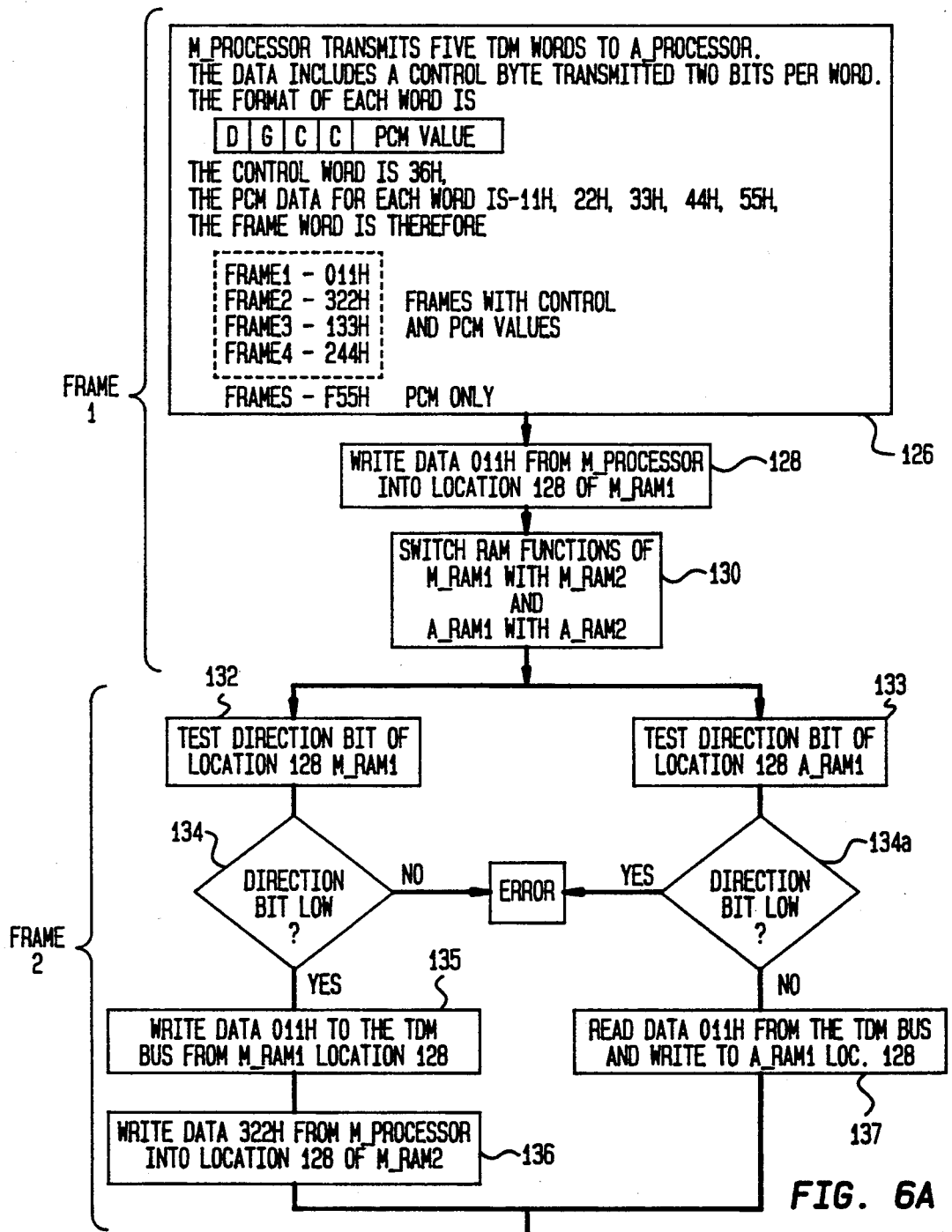

FIG. 7C (FRAME 3)

FIG. 8A (FRAME 3)

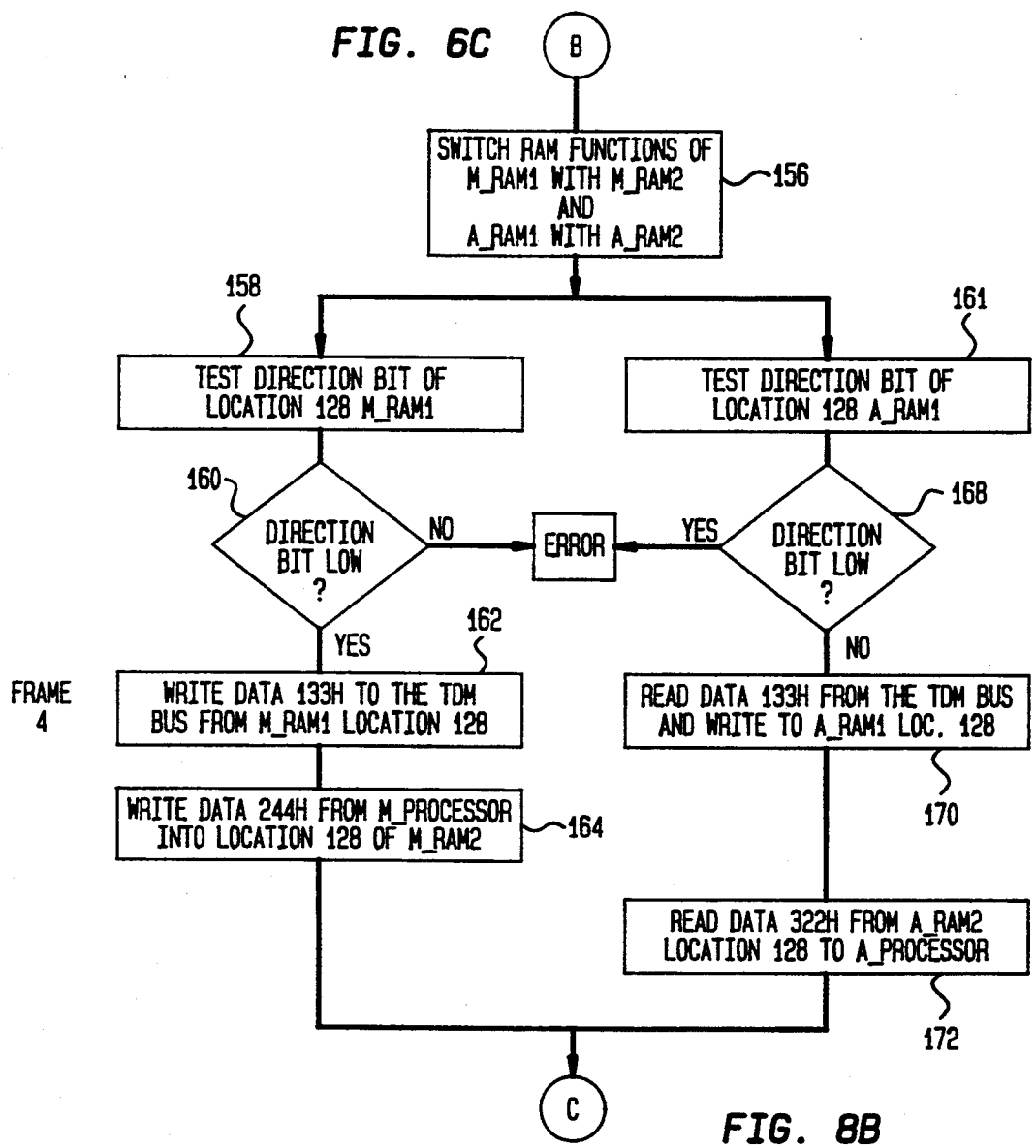
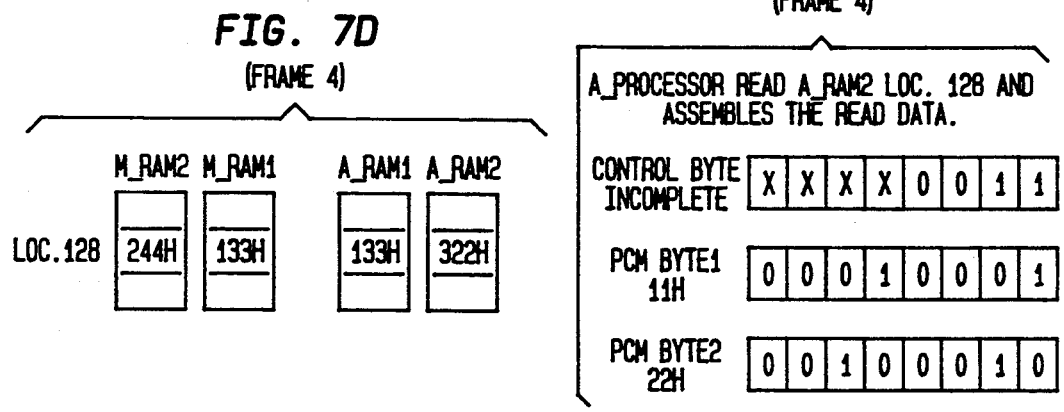

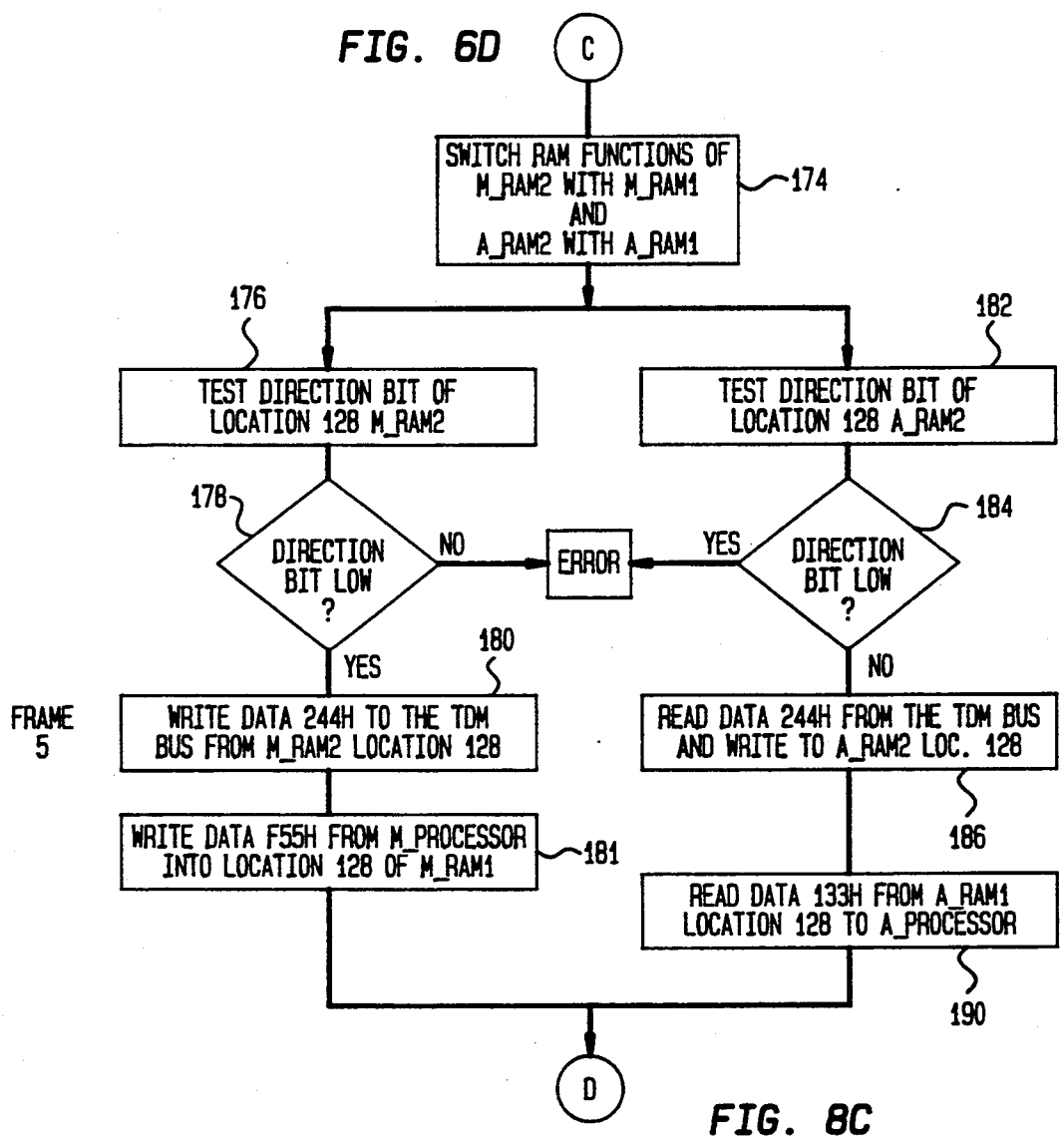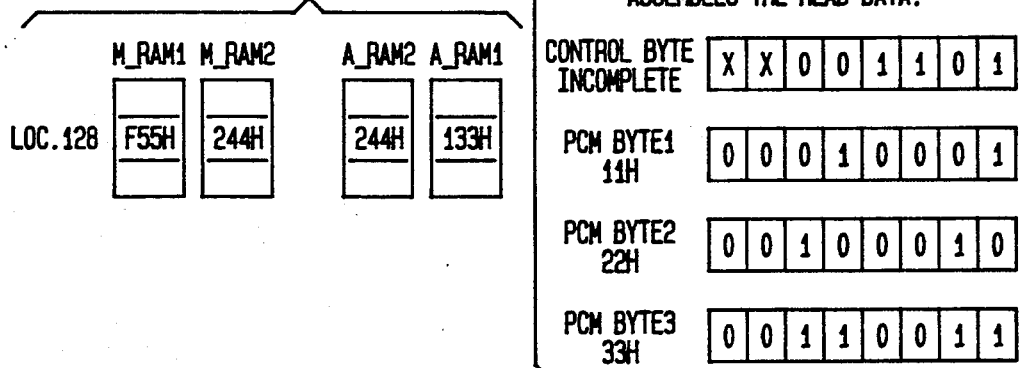

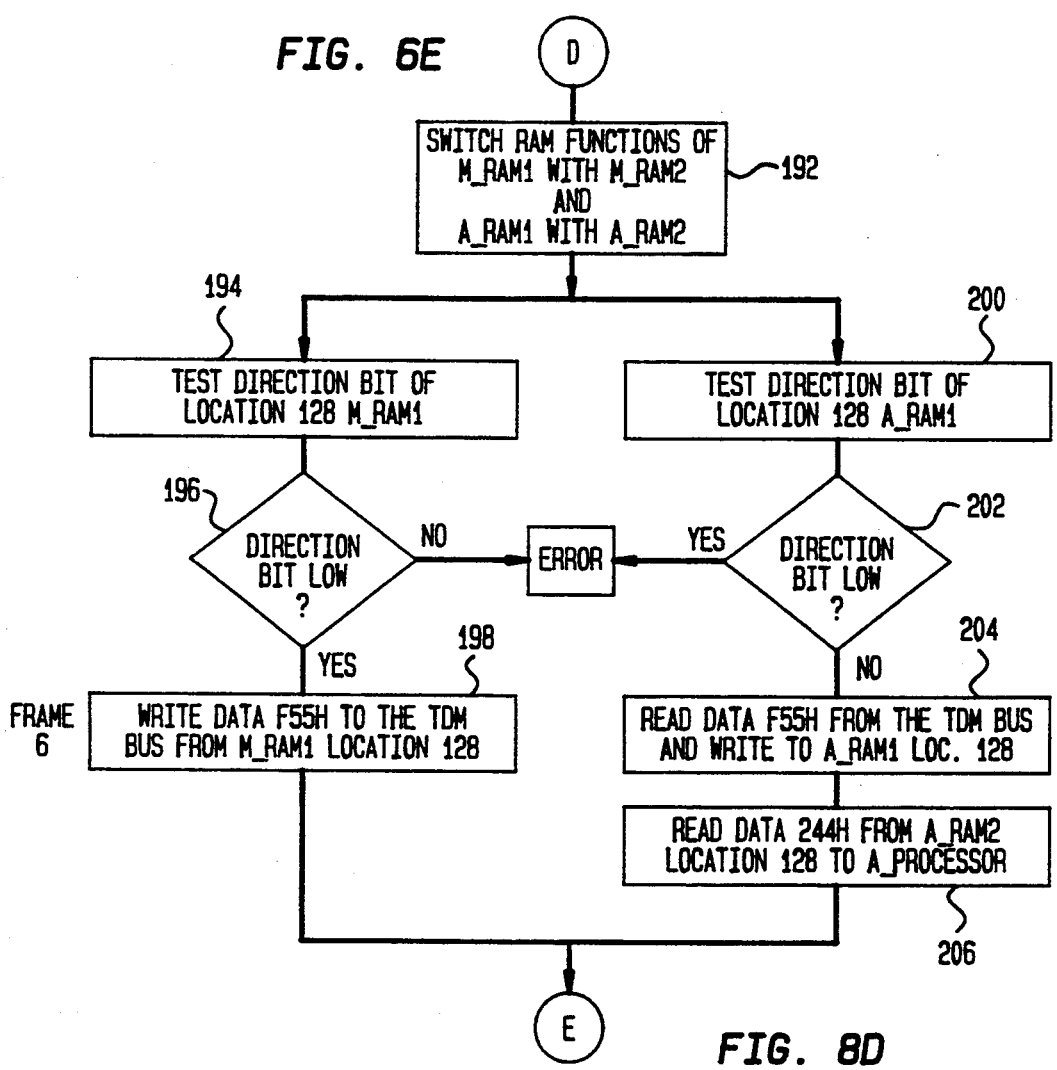
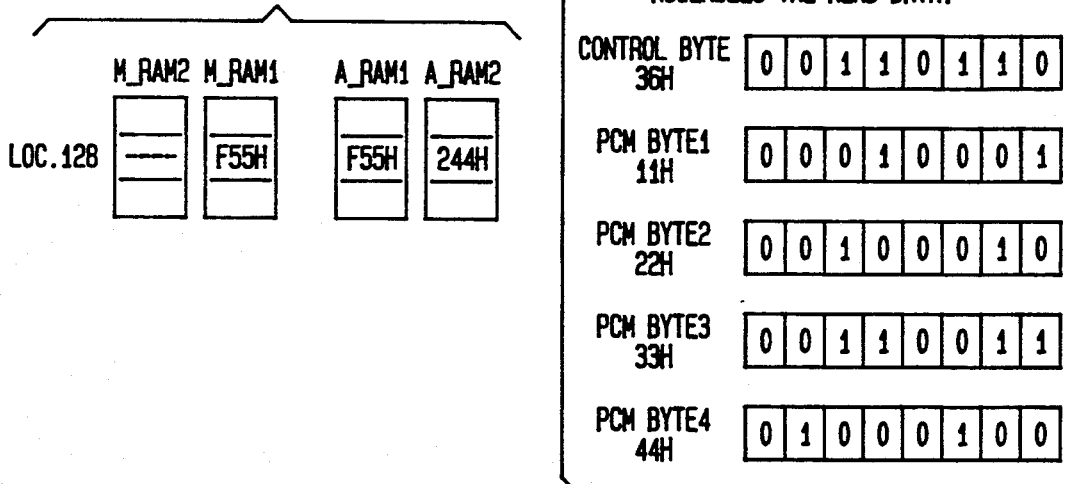

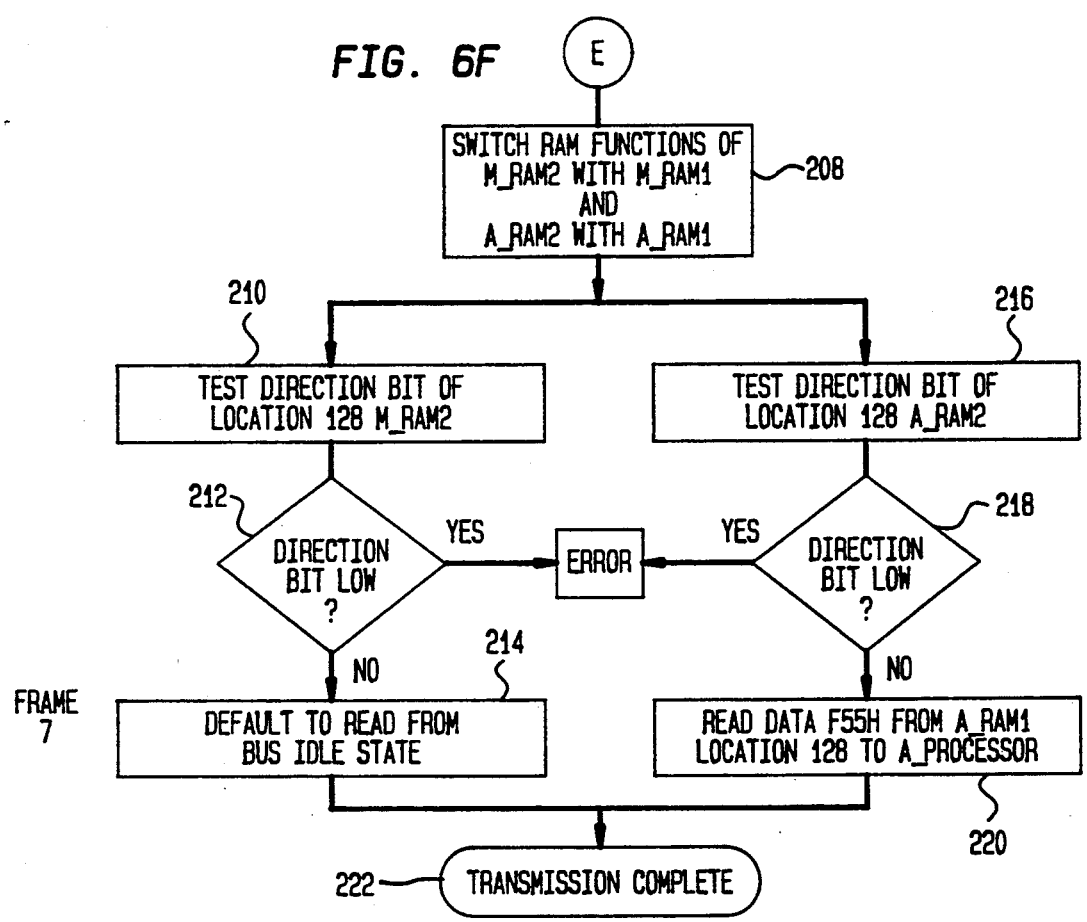
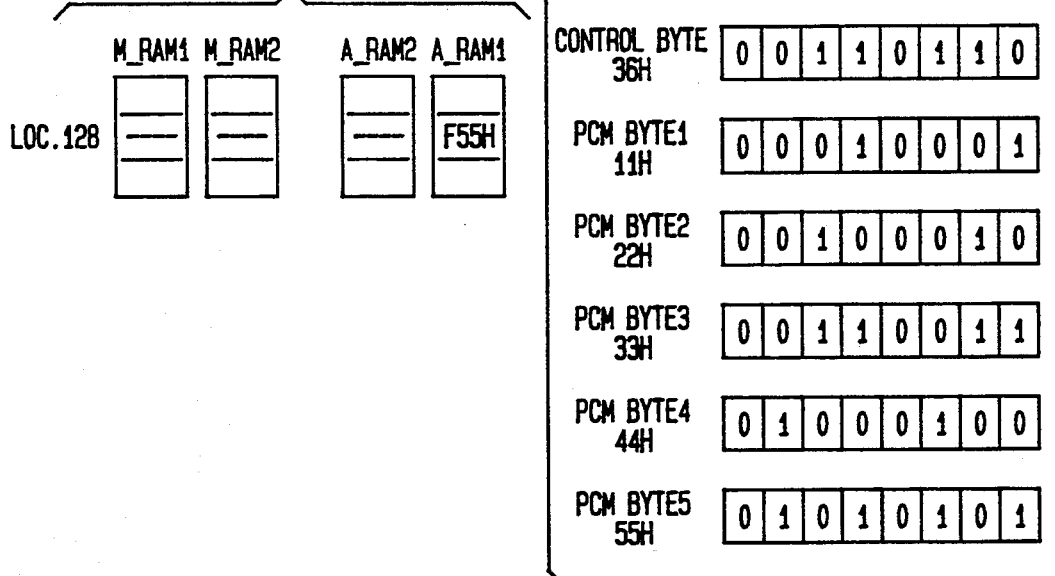

TIME DIVISION MULTIPLEXER CHIP FOR SUPPORTING ALTERNATING COMMUNICATION BETWEEN A PAIR OF RAMS AND TWO DIFFERENT INTERFACES

BACKGROUND OF THE INVENTION

Digital voice processing systems are known that are in communication with telephone systems and perform functions such as voice signal compression, storage and retrieval, automatic gain control, voice activated operation, telephone functions and the like. These functions are performed by such systems in hardware which is costly and inflexible. In addition, expansion of a prior art voice processing system was difficult because of the need of additional hardware, not only because of the expense associated therewith, but also because of the geography factor, i.e., a larger footprint was required.

With the ever increasing change in technology, particularly software, it would be advantageous to be able to provide a software based digitized voice processing system that can be quickly, conveniently and inexpensively expanded. In addition, it would be advantageous to provide a digital voice processing system that is capable of handling a large amount of data and to which one can add capacity as required.

One drawback in providing such a voice processing system was the unavailability of a processing chip that could multiplex data to and from a time division multiplexer bus and to and from a plurality of processors and which has a small size.

SUMMARY OF THE INVENTION

A general purpose time division multiplexer (TDM) chip has been conceived and developed that has particular use in a modular digital system wherein voice processing functions are run in software. This TDM chip can be used in a modular structure wherein units can be readily added or removed. Such a modular structure can be a voice processing system wherein application software resides in circuit boards that are coupled to a host computer so that the software can be changed as applications require and the number of circuit boards can be increased readily for greater capacity. The host computer is in communication with a one or more voice processing circuit boards that perform digital voice processing, telephone signal processing and application processing. The voice processing circuit boards are in communication with one or more audio circuit boards through a time division multiplexer (TDM) bus. Each audio circuit board includes an analogue unit that receives analogue signals from direct connect and loop start telephones, PBX's, PWN's and the like, converts the analogue signals to digital, and sends the digital data to a signal processing chip that is used as a high speed multiplexer. The signal processing chip then sends the signals through a TDM chip, which is the subject of the instant invention, onto the TDM bus and they are subsequently received by the voice processing circuit board. In the voice processing circuit board, signal compression, automatic gain control, voice activate operation, and application processing takes place. Subsequent to the application processing taking place, data is transmitted from the voice processing circuit board to the host computer for further processing and storage.

The TDM chips in the voice processing circuit boards and the audio circuit boards are identical except that the TDM chips of the audio circuit boards have fewer elements connected because of the lesser number of components in each audio circuit board. The heart of the TDM chip is a pair of RAMs which operate in ping pong fashion and the elements that bring about such operation. This allows processors in each circuit board to write and read from one RAM while exchange of data with the TDM bus is taking place with the other RAM. After a selected period, the communications of the RAMs in both circuit boards are reversed with regard the RAMs' communicating with the bus and respective processors. Each TDM chip includes at least one interface unit that provides communication between the RAMs and the processor(s) seeking access to the RAMs.

BRIEF DESCRIPTION OF THE DRAWING

FIG. 4 is a timing diagram for the system shown in FIG. 1;

FIGS. 5A-5H shows a plurality of locations in the RAMs of FIGS. 3 and 4 with data therein; FIGS. 6a-6f collectively show a flow chart describing the operation of the TDM chips shown in FIG. 1; FIGS. 7a-7g illustrate a single location in all four RAMs of the TDM chips shown in FIG. 1 and correspond to FIG. 6a-6f; and FIGS. 8a-8e is a representation of data in the RAM locations corresponding to FIGS. 6b-6f.

DETAILED DESCRIPTION OF THE PREFERRED EMBODIMENTS

Figure 1:
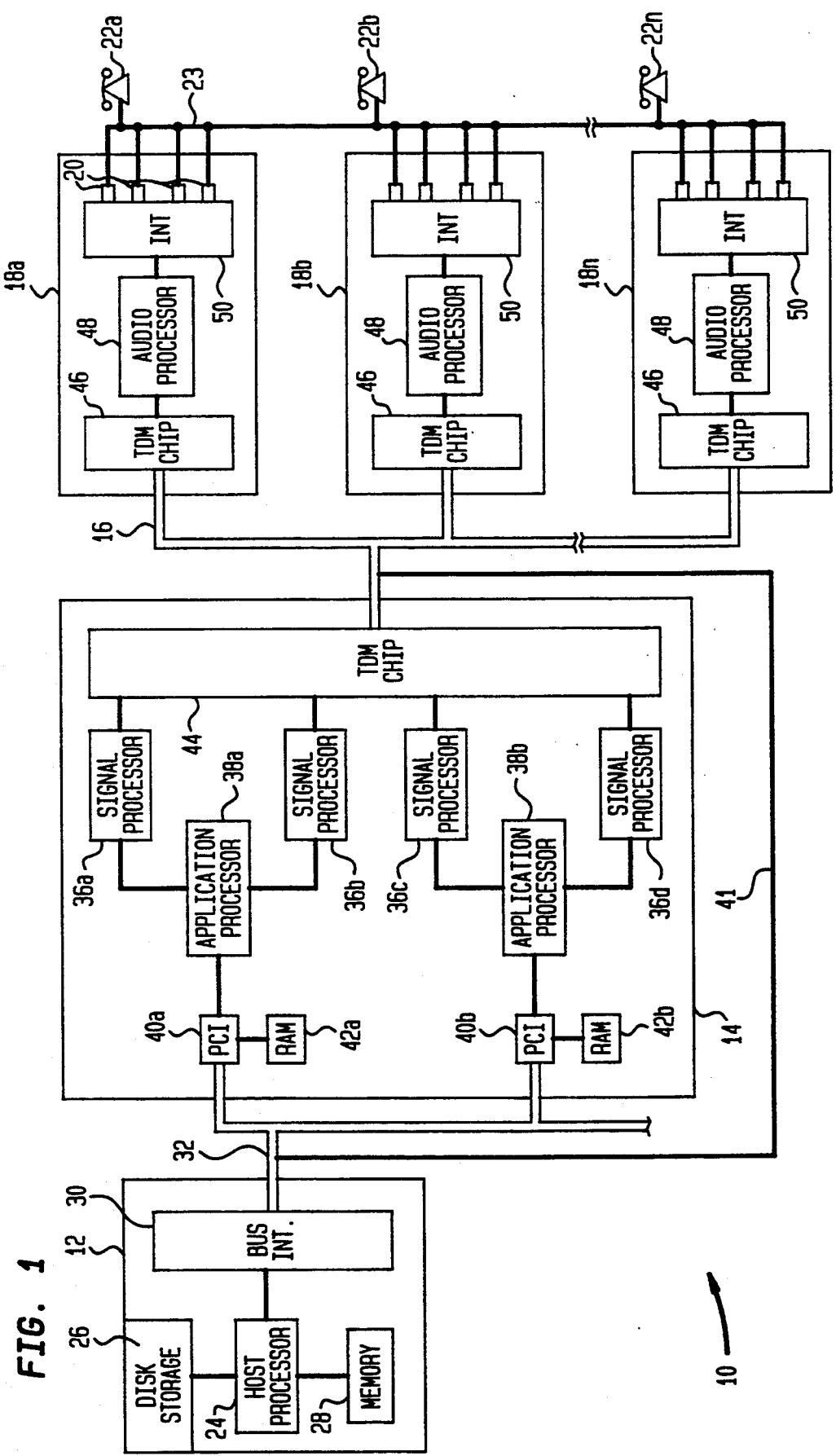
FIG. 1 is a block diagram of a system in which the time division multiplexer chip of the instant invention can be practiced.

With reference to FIG. 1, a block diagram is shown generally at 10 of a digital voice processing system in which the TDM chip of the instant invention has utility. It will be appreciated that this is for illustrative purposes only as the TDM chip of the instant invention is a general purpose, multiple processor capable of communicating with a TDM bus. The system 10 has a host computer 12, a plurality of voice processing circuit boards 14, only one being shown in FIG. 1, and a bus 16 that connects the voice processing circuit board to a plurality of audio circuit boards 18a, 18b . . . 18n. For purposes of convenience the circuit boards and 18 will be referred to as "cards". Each audio card 18a, 18b . . . 18n has four ports 20 through which communication can be had with a plurality of devices such as direct connect and loop start telephones 22a, 22b . . . 22n, through telephone lines 23 through which functions such as telephone communication, dictation, answering machines and the like can be performed.

The host computer 12, which can be any of a number of commercially available computers such as an IEEE 996 Standard PC/AT, includes a processor 24 that is in communication with a disk storage 26 and a memory 28. The host processor 24 is also in communication with a bus interface 30. The disk storage 26 acts as a storage medium for prompts, operating data, base directory information and other data. Prompts are recorded messages, instructions and menus that are for the purpose of assisting a caller in the use of the voice processing system 10. The disk storage also provides data storage capacity when the capacity of other memories in the system are exceeded. The memory 28 is a volatile memory which recovers the operating code for the system 10 from the disk storage 26 on start up. The memory 28 also stores diagnostic information and serves as a buffer. The bus interface 30 provides communication between the host processor 24 and the voice processing card 14 through a bus 32. The voice processing card 14 is shown and described in greater detail in concurrently filed patent application having Ser. No. 815,207 now abandoned and entitled Digital Signal Processor Circuit Board which is hereby incorporated by reference.

The voice processing card 14 has essentially two independent circuits therein which will be described simultaneously. Each circuit has a host computer interface (PCI) chip 40a, 40b to which a RAM 42a, 42b, respectively, is connected for temporary storage of data and storage of the operating code for the voice processing card 14. Details of this PCI chip 40a, 40b, are given in concurrently filed patent application Ser. No. 816,516 now abandoned and entitled Interface Chip for a Voice Processing System, which is hereby incorporated by reference. Each PCI interface 40a, 40b is in communication with an application processor 38a, 38b, respectively, such as an Intel 80C186. The application processors 38a, 38b run the application programming and database management. Each application processor 38a, 38b is in communication with and controls a pair of signal processors 36a and 36b and 36c and 36d, respectively, each of which contains an algorithm for voice compression and expansion, depending upon direction of the data stream, tone detection and voice activated operation. The signal processors may be TMS 320C25 processors from Texas Instruments. All the signal processors 36a-36d are in communication with a TDM chip 44 which is the subject of the instant invention.

Each audio card 18a, 18b . . . 18n is in communication with the bus 16 and includes another time division multiplexer (TDM) chip 46 which is the same as to the TDM chip 44 of the voice processing card 14 except that is has fewer components connected as will be explained hereafter. The TDM chip 46 is in communication with the bus 16 and with a high speed audio processor 48 such as a TMS 320C10 available from Texas Instruments, the latter being in communication with an analogue interface 50 which interfaces through the ports 20 with a plurality of telephones 22a, 22b . . . 22n. The audio cards 18a-18n of this embodiment each has four ports 20. The analogue interface 50 can also communicate through their ports 20 with private branch exchanges (PBX), private wire networks (PWN) and the like. The audio card 18 is shown and described in concurrently filed patent application having Ser. No. 815,205, now abandoned, and entitled Audio Signal Circuit Board and is hereby incorporated by reference.

Figure 2:
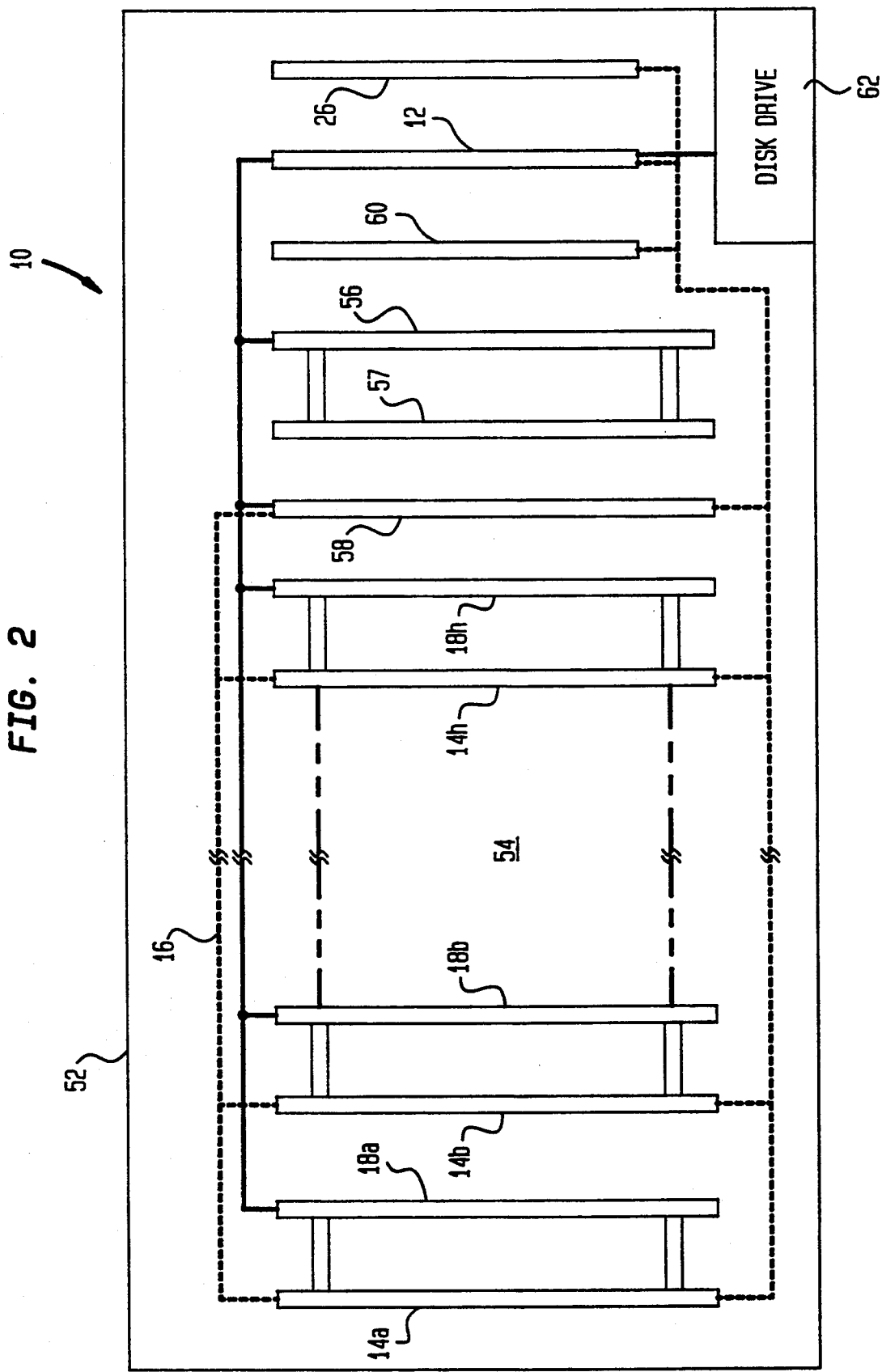
FIG. 2 is a plan view of the system shown in FIG. 1.

With reference to FIG. 2, the layout of the digital voice processing system 10 is shown in plan view. The system 10 includes a housing 52 having a base 54 to which the voice processing cards 14 and audio cards 18 are physically attached in pairs without necessarily being logically connected so that the cards 14, 18 can be logically intermixed with one another. More specifically and by way of example, the voice processing card 14b can be physically connected to the audio card 18b but logically connected to the audio card 18a. The voice processing cards 14a, 14b . . . 14h provide physical support and electrical connections to the audio cards 18a, 18b . . . 18h. As shown in FIG. 2, the system 10 is made up of eight pairs of voice cards 14 and audio cards 18, but fewer or more such cards can be included depending upon need. Some of the voice processing cards 14 could be replaced with dummy cards 57 that only provide the physical support and electrical connections to the audio cards 18 without logic. Also included is an optional a 16 port audio card 56 that provides expanded capacity, a clock buffer 58, a local area network (LAN) card 60 that can provide local area networking, the host computer 12, the disk storage 26 and a disk storage drive 62. The voice processing cards 14 have the capacity to serve more than one of the audio cards 18 and also serve 16 port audio cards 56 that may be added as required to the system 10. The 16 port audio card is supported by a dummy card 57. A bus 41 provides connection between the host computer 12 and the audio cards 18, 56 for the purpose of directing the locations in memory that are to be accessed as will be described hereinafter.

Figure 3:
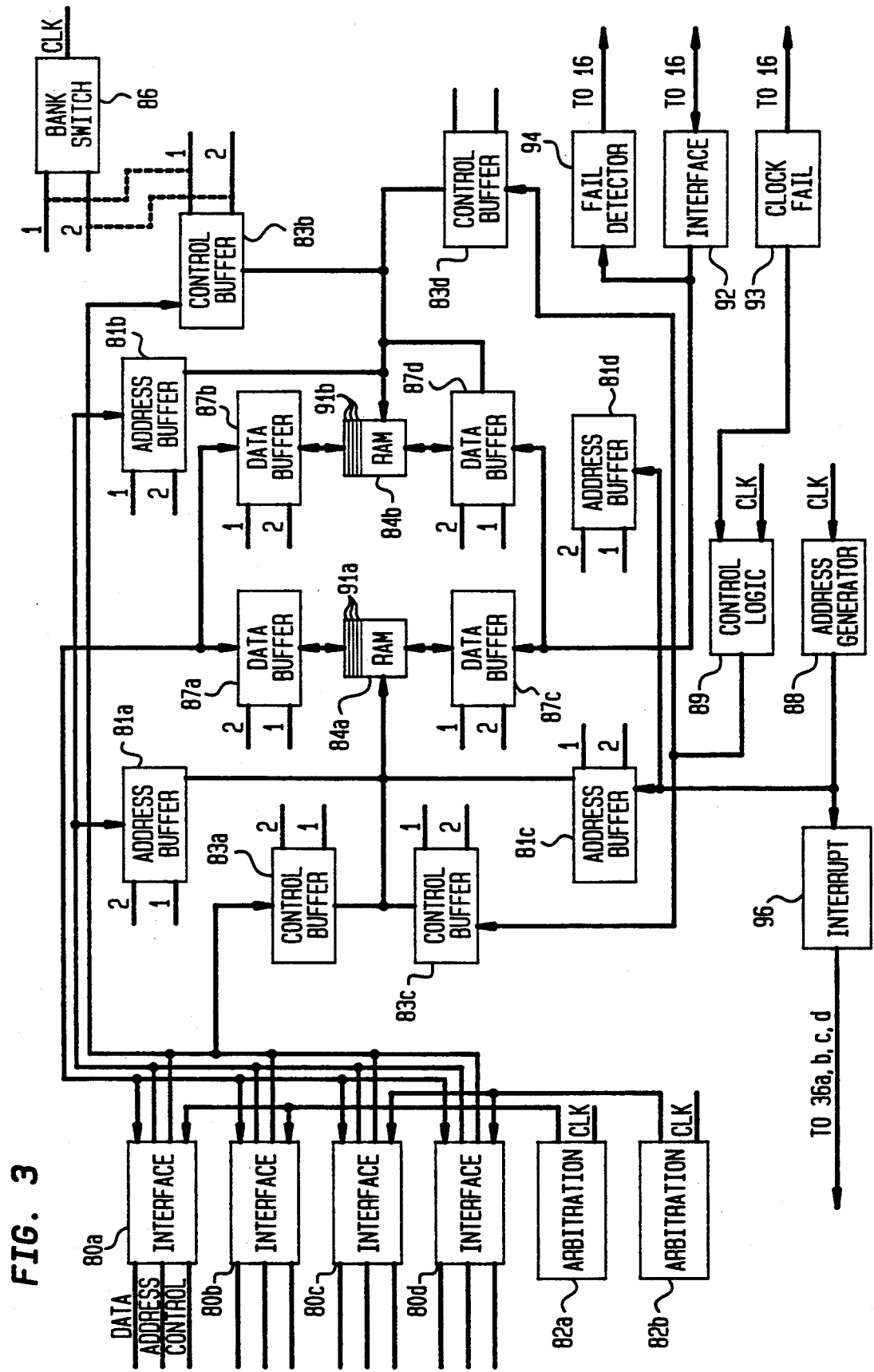
FIG. 3 is a block diagram of one embodiment of the TDM chip of the instant invention.

With reference to FIG. 3, the TDM chip 44 of the voice processing card 14 is shown in detail. Physically, the TDM chip 44 is only ⅜"×⅜" in size. As stated previously, the TDM chip 46 of the audio card 18 is the same but has fewer components connected. The TDM chip 44 includes four interfaces 80a-80d, each of which is in communication individually with a signal processor 36a-36d (FIG. 1), respectively. A pair of arbitration units 80a and 80b, are in communication with the interfaces 80a-80d, for controlling access of the interfaces to a RAM in an arbitration mode as will be described hereafter. Each arbitration unit 82a, 82b is in communication with a pair of interfaces 80a, 80b and 80c, 80d, respectively.

The interfaces 80a-80d also are in communication with a pair of SRAMs 84a and 84b through address buffers 81a-81d control buffers 83a-83d, and data buffers 87a-87d. All of the buffers 81a-81d, 83a-83d and 87a-87d are in communication with a bank switch unit 86. The bank switch unit 86 receives a frame synch which will be described hereinafter. A time slot address generator 88, which serves the counting function, receives a clock signal and is in communication with an interrupt 96 and with the signal processors 36a-36d. A bus interface 92 is in communication with the bus 16 (FIG. 1) and with the data buffers 87c and 87d for the transfer of data between the SRAMs, 84a, 84b and the bus 16. A clock fail detector 93 is provided to determine if there is a clock failure. A fail detector unit 94 is in communication with the interface 92 and the bus 16. This fail detector unit 94 is a latch that latches in the data that is being written onto the bus 16 by the interface 92 and compares this latched data to the data that is written on the bus. If the comparison shows the latched data is not the same as the written data, a bus fail will be output by the unit 94 which will be received by the host computer 12.

The interrupt 96 is in communication with the signal processors 36a-36d (FIG. 1) and with the time slot address generator 88. The interrupt unit 96 generates four interrupts each frame. A control logic unit 89 is in communication with the control buffers 83c and 83d and the clock fail unit 93 and receives a clock signal. The TDM chip 46 of the audio cards 18a-18n is the same as the TDM chip 44 just described except that only one interface 80a is required as there is only one audio processor 48 with which it communicates. No arbitration unit is required because of the single interface 80a. Otherwise, all the other components are the same.

With continued reference to FIG. 3, the TDM chip 44 includes a pair of RAMs 84a, 84b, preferably SRAMs, which are in connection with the address buffers 81a–81d, the control buffers 83a–83d and the data buffers 87a–87d. Each of the SRAMs 84a, 84b has 256 locations 91a, 91b which are 12 bits in width. The TDM bus 16 has 256 time slots and 12 bits of information so that a correlation exists between the SRAMs 84a, 84b and the bus. More specifically, all 256 locations in the SRAMs 84a, 84b will be accessed during one frame.

With reference to FIG. 4, a description of the timing of the TDM chip will be given. A frame synchronization will repeat at an 8 kHz rate for every 125 microseconds, each RAM array, i.e. 256 locations 91, has to be addressed within the 125 micro seconds. Each location 91 represents a time slot; time slot zero being location zero on all the SRAMs, 84a, 84b of both the voice application card 14 and the audio cards 18. Time slot one is location one and there is a direct correlation from the SRAM location 91 to the time slot. When a processor 36, 48 is accessing an SRAM 84, it will have access to two locations at a time, i.e., locations 0 and 1. The two RAMs 84a, 84b are riding in a ping pong fashion on the frame boundary under control of the bank switch unit 86, a frame being 125 microseconds, as stated, and the boundary being the beginning of a frame. While one RAM 84a is accessing the TDM bus 16, the other SRAM 84b is being accessed by signal processors 36 attached to the interfaces 80 at any given time. At the end of a frame, the communications of the RAMs 84a, 84b are switched so that SRAM 84b now has access to the TDM bus and the SRAM 84a is now being accessed by the processors 36 connected to the interfaces 80a–80d. This is accomplished by the bank switch unit 86 through the address buffers 81a–81d, control buffers 83a–83d, and data buffers 87a–87d. The bank switch has two buffer control outputs #1 and #2 that are transmitted on buffer lines as indicated by FIG. 3. When the #1 buffer line enables address buffers 81b, 81c control buffers 83b, 83c, and data buffers 87b, 87c, the SRAM 84b would be in communication with the bus 16. At the same time, the bank switch 86 sends a signal over #2 buffer line to address buffers 81a, 81d, control buffers 83a, 83d and data buffers 87a, 87d and SRAM 84a would be in communication with the interfaces 80a–80b. When a frame changes, the bank switch unit 86 will output a #2 signal to address buffers 81b, 81c, control buffers 83b, 83c, and data buffers 87b, 87c and a #1 signal to the other buffers 81b, 81d; 83b, 83d and 87b, 87d, so that SRAM 84b would now attach to the bus 16 and SRAM 84a would be attached to the interfaces 80a–80d.

With reference to FIG. 4, the synchronization of the above procedure is performed by the clock buffer 58, see FIG. 2, which outputs a frame synch at a rate of 8 kHz. The clock buffer 58 generates two 4 kHz clocks. One clock is a quadrature of the other; namely, it is 90 degrees out of phase which produces four megahertz, 4 quadratures. This provides switching edges that are equivalent to 8 megahertz. The clock buffer 58 is centrally located within the chassis 52 so there is only the one clock source for all cards in the system. The clock buffer 90 is redundant, i.e. there are two separate clock circuits in clock buffer 58, so that if the primary clock is lost, there will be a backup, but there is only one clock source in the system. A frame synch of 8 kHz was selected because a voice system utility uses this frequency. For other applications, different frequencies and periods can be selected.

Frame synchronization comes from the clock buffer 58 and synchronizes all TDM chips 44 in the system 10 to the clock signals. Frame synchronization will repeat at an 8 kHz rate every 125 micro seconds; therefore, the logic in the TDM bus 16 logic has to address an entire SRAM 84 array of both cards 16, 18 simultaneously within 125 micro seconds. At the end of 125 micro seconds, a frame synch will act upon the bank switch 86 to switch the communication of the RAMs 84a–84b. In addition, the processors 36a 36d, have only 62½ micro seconds if in the arbitration mode and 31¼ seconds if in the interrupt mode in which to access an SRAM 84 to which it is attached through the interfaces 80a–80d. The interrupt mode and arbitration mode will be described more fully hereinafter.

Every location 91 of an SRAM 84 does not need to be accessed. The host computer 12 will determine which of the locations in the SRAMs are to be accessed based upon the activities taking place. For example, there might be 8 to 16 locations 91a that might be accessed from the RAM 84a which gives a signal processor 36a, 36b (FIG. 1) more than enough time to access the SRAM. On the other hand, in the RAM 84b, every location 91b may have to be accessed, but this is highly unlikely.

The SRAMs 84a, 84b ping pong operation allows the processors to write and read from one SRAM, while the TDM bus 16 is attached to the other SRAM. This is the "real time" aspect of the invention. On the other side of the bus 16 are similar TDM chips 46 which are part of the audio cards 18. Reading from and writing to one of the SRAMs 84a, 84b of the TDM chip 44 by an audio processor 48 is taking place while data is being transferred across the bus 16 by the other SRAM. This creates a real time transfer across the TDM bus 16.

In FIGS. 5A–5H a number of locations 91 of SRAMs 84a, 84b are shown, each location being twelve bits wide. FIG. 5A can be either of the audio card 18 or the signal processor card 14 and represents location "0" of an SRAM 84. Each FIG. 5A–5H represents one of 256 locations of an SRAM 84. The first two bits of the location 91 represent control or status bits as seen in FIG. 5A. Each control and status word consists of eight bits so that four frames are required to transmit a control or status word. A control word indicates that data is to be sent to the audio card from a signal processor 36 directing the audio card to perform a specific task. For example, the audio card 18 may be instructed to go off hook when a telephone 22 is requesting service. A status word goes from the audio card 18 to a signal processor 36 to indicate status of the audio card 18. For example, someone may be waiting to place a call through one of the telephone lines 23. The status word would indicate the need of service and, most likely, would be followed by a command word from the signal processor to provide the service. The third bit is a gate bit that indicates whether the control/status bit is valid. The fourth bit is a direction bit that informs an appropriate processor 36, 48 that data can be written into an SRAM location if the direction bit is low, but if the direction bit is high, data can only be read from the location. The fifth through the twelfth bits represent the voice data to be sent or received. If data is being transmitted by the signed processor 36 to an audio card 18, the bits are control, control and direction "0" as seen in FIG. 5B, 5D. The gate bit would be low, FIG. 5B, if the direction bit is true, but high if false, FIG. 5C. If data is to be read by an audio card 18, the bits would be status, status, gate low and direction "1" as shown in FIGS. 5E and 5I, the four locations providing the status word.

With regard to assignments of locations in the SRAM, with smaller systems each port 20 of an audio card 18 would be assigned a specific location. This same location would be addressed for the data to and from a specific port 30. In larger systems 10, i.e., systems with a large number of four port audio cards 18 and 16 port audio cards 56, the SRAM locations accessible by the data to and from the ports 30 would be assigned by the host computer 12 which would communicate with the application processors 38 through the bus 32 and with the audio processors 48 through the bus 41.

When one processor 36, 48 is writing into a given location of an SRAM 84, all other processor on the TDM bus 16 must be in the read mode for that particular location on all the other SRAMs 84, which means that their respective processors would have written a "one" on the direction bit. It is possible to have the direction bit set true for the same location. This means that, for example, if SRAM 84a had the direction bit low in time slot zero and another TDM chip 44 had time slot zero direction bit low, then when the TDM bus 16 interface logic saw it, both processors would attempt to write data into the same location. This condition would be detected and labeled as a fault and the fault would be transmitted back to the application process 38. A routine would be run by an application processor 38 to decipher what to do about the erroneous entry.

An SRAM 84 gets updated for every location in one frame. This allows any one of the signal processors 36a–36d and audio processors 48 to read the data on the SRAM 84 in one frame. Even though a location 91 may have data written thereto, that location is also read during a frame.

With this system, switched time slots on RAMs is achievable. For example, a time slot from zero can be read and then written into time slot 28. This enables the information from location zero to be placed on a different location so that somebody else can also read the data. This provides the capability of conference calling.

Two signal processor 36a–36d through their interfaces 80a–80d, cannot access an SRAM 84a, 84b at the same time; otherwise, there would be contention. Therefore, two modes of operation are provided for the TDM chip: an interrupt mode and an arbitrated mode which are controlled by the interrupt unit 96 and the arbitration units 82a–82b.

In the interrupt mode, the interrupt unit 96 will interrupt a signal processor 36 through an interface 80a–80d to let it know that it has access to an SRAM 84. That interrupt occurs in synch with the frame synchronization, see FIG. 4. Consequently, at time slot zero, which is where a frame synch occurs, the signal processor 36a from the interrupt unit 96 attached to the interrupt 80a would receive an interrupt telling it that it has access to one of the SRAMs, and that processor 36a has 31¼ microseconds to access all 256 locations 91 of the SRAM. Then, one quarter of the way into the frame, which is 31¼ micro seconds later, the processor 36b attached to interface 80b would get an interrupt, likewise 31¼ micro seconds later there a 3rd interrupt and the processor attached to interface 80c would get an interrupt, and, again, 31¼ micro seconds later the fourth signal processor 36d would get an interrupt. The frame of 125 micro seconds is split into four thereby allowing each signal processor 36a–36d 31¼ micro seconds to communicate with one of the SRAMs in the interrupt mode.

The interrupt 96 puts some constraints in the system in that each signal processor 36a–36b has to come in and get out and complete its communication with an SRAM 84 within 31¼ micro seconds. If it doesn't, another signal processor 36 is going to come in.

In the arbitration mode, the arbitration units 82a, 82b will determine if one of the RAMs 84a, 84b is busy with a signal processor 36. For example, if the signal processor 36a attached to interface 80a is busy, the other signal processor 36b attached to interface 80b is delayed during the time the SRAM is busy. After completion by the first signal processor 36a of the first transaction, the arbitration unit 81a allows access by the second signal processor 36b for the remainder of the 62.5 micro seconds. The signal processors 36a, 36b attached to the two interfaces 80a, 80b can gain access to a SRAM 84 so that between these two signal processors they will have access to the SRAM for a shared period of 62½ micro seconds. If the signal processor 36a has no activity and the other signal processor 36 has a great deal of each activity, the latter could have use of the full 62½ per sec.

This is done in groups of two such that 62% micro seconds later, the second set of signal processors 36c, 36d attached to interfaces 80c, 80d would be allowed arbitrated access in the same manner.

Figure 6B:
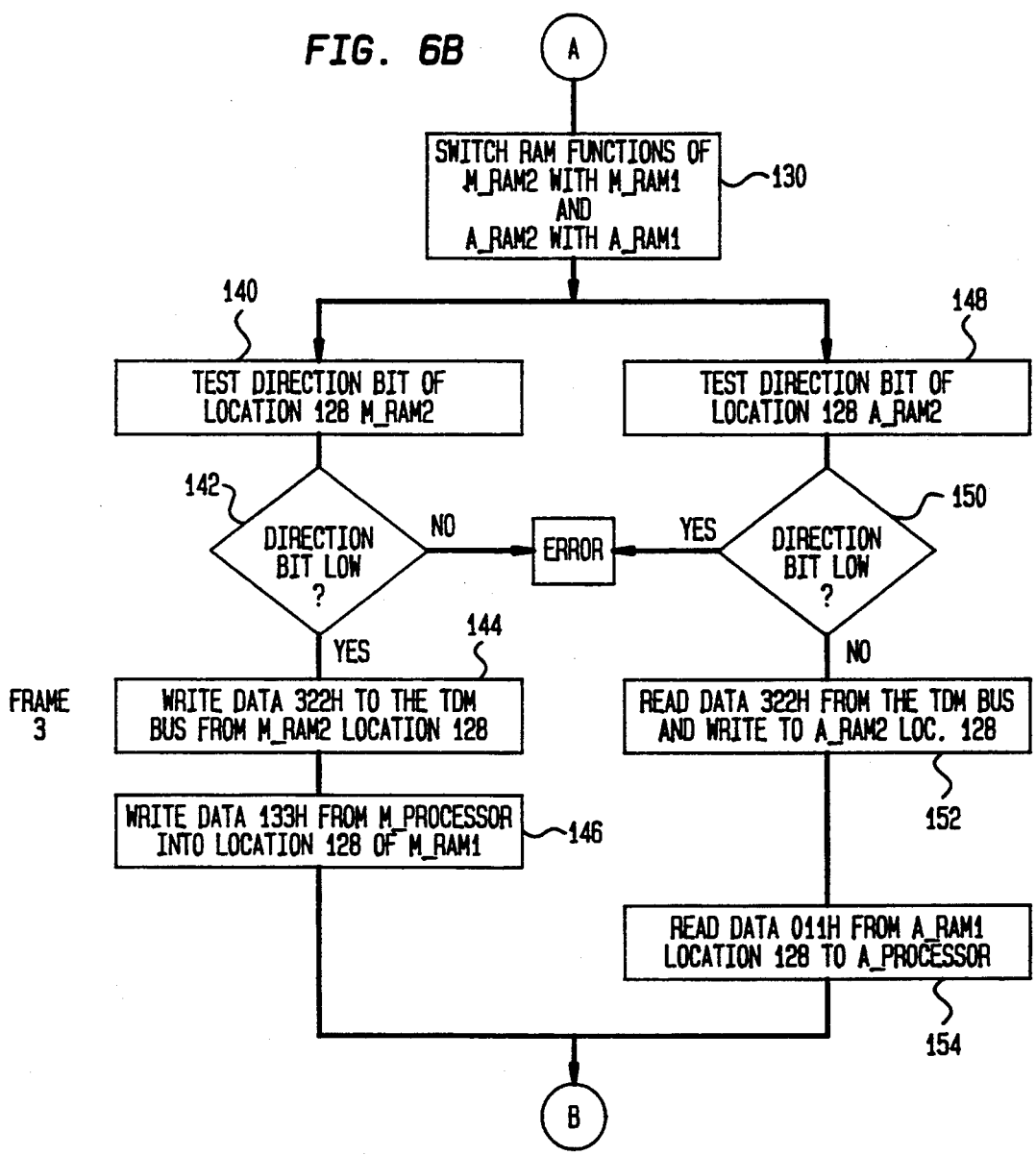

With reference to FIG. 6 the operation of the TDM chips 44 and 46 will be described with regard to the manner in which data is read from and written into one location, location number 128, of the SRAMs 84a, 84b with a brief explanation of the parameters given at 126. M-RAM1 identifies RAM 84a and M-RAM2 identifies RAM 84b of the voice processing card 14. A-RAM1 identifies RAM 84a and A-RAM2 identified RAM 84b of an audio card 18. The frame number is given on the left margin. It shall be kept in mind that the audio card 18 has only one interface 80 as discussed previously. FIGS. 7a and 7b correspond to FIG. 6a and show which location has data during a given frame, for example O11H representing data received in M-RAM1 during the first frame. FIGS. 7c–7e correspond to FIGS. 7b–7d, respectively. FIG. 8a–8e show the value read by a processor in the RAMs. FIGS. 8a–8e correspond to FIGS. 6b–6f, respectively.

In frame 1, data is written 128 into location 128 of M-RAM1 by a signal processor 36a and the SRAMs will be switched 130. The incoming data will be in digital form and its direction bit is tested 132. An inquiry will be made whether the bit is low 134. If the direction bit is low data is written 135 into M-RAM1 location 128 and further data is written in M-RAM2 136. If it is not low an error is indicated. Simultaneously, the direction bit of A-RAM1 is tested 33 and an inquiry is made 134a whether it is low. If no, data is read from the bus 16 and written 137 into location 128 of A-RAM1. But if yes, an error is indicated. The RAMs on both TDM chips 44, 46 are switched 138. The direction bit at location 128 of M-RAM2 is tested 140 and an inquiry is made 142 whether the bit is low. If "no" an error condition is set but if "yes" data is written 144 onto the bus 16 from location 128 M-RAM2. Simultaneously, the direction bit at location 128 A-RAM2 is tested 148 and an inquiry is made 150 as to the direction bit at location 128 of A-RAM2. If it is high, an error is indicated, but if it is low, then data is is written 152 into location 128 A-RAM2. The data at location A-RAM1 is then read 154 by the audio processor 48.

The RAMs on both cards 14, 18 are switched 156 at the boundary of Frame 4 and the direction bit at location 128 M-RAM1 is tested 158. An inquiry is made 160 whether the direction bit is low 160. If not, an error condition is set. If "yes" data is written 162 to the TDM bus 16 from location 128 of M-RAM1 and data is is written 164 into location 128 of M-RAM2 by a signal processor 36. Within the same frame, the direction bit of location 128 A-RAM1 is tested 166 and an inquiry is made 168 whether the bit is low. If "yes" an error condition is set, but if "no " the data is read from the TDM bus and written 170 into location 128 A-RAM1 and the data at location 128 A-RAM2 is read 172 by the audio processor 48.

The RAM functions are then switched 174 at the frame boundary of frame 5. The direction bit for location 128 M-RAM2 is tested 176 and an inquiry is then made 178 whether the direction bit in M-RAM 2 is low. If not, an error condition is set, but if so, data is written 180 into location 128 of M-RAM2 and data from a processor 38 is written into location 128 of M-RAM 1 181. The direction bit at location 128 A-RAM2 is tested 182. An inquiry is made whether the bit is low 184. If yes an error is indicated, bit if no, data is read from bus 16 and written 186 into location 128 A-RAM2. The data on A-RAM 1 is read 190 by the audio processor 48.

The functions of RAMs are switched 192. The direction bit of location 128 M-RAM1 is tested 194 and an inquiry is made 196 whether the direction bit is low. If not, there is an error, but if "yes" data is written 198 to the bus 16 from location 128 M-RAM1. The direction bit at location 128 A-RAM1 is tested 200 and an inquiry is made 202 whether the direction bit is low 202. If "no" the audio processor 48 reads data 204 from the bus 16 and writes it into location 28 A-RAM1 and data is read 206 from location A-RAM2 by the process 48. If the inquiry 202 is "yes" an error is indicated.

The RAMs are switched 208 at the boundary of frame 7 and the direction bit of location 128 M-RAM2 is tested 210. An inquiry is made whether the direction bit is low 212. If yes, an error condition is set, but if no there is a default to read 214 from the bus 16 idle state. Simultaneously, the direction bit of location 128 A-RAM2 is tested 216. An inquiry is made whether the direction bit is low 218. If yes, an error condition is set, but if not data from location 128 A-RAM1 is read 210 by the audio processor 48. Thereafter the transmission is completed 222.

Thus what has been shown and described is a TDM chip that provides optimum communication and use of components. By having two RAMs whose communication with associated components alternate as described, one achieves a two fold increase in memory without the need of one large memory having twice the capacity. By having two RAMs, each of which is functioning at all times, the amount of time required for a cycle is reduced by half. More specifically, the system checks the status of memory locations on both RAMs and respond accordingly rather then checking the status of only one memory location in the same period.

What is claimed is:

1. A time division multiplex chip, comprising:
    at least one first interface,
    a pair of RAMs in alternate communication with said at least one first interface, wherein said at least one first interface is a plurality of interfaces and further comprising an interrupt unit in communication with said plurality of first interfaces for controlling which of said first interfaces is to be in communication with one of said RAMS,
    a second interface in alternate communication with said pair of RAMs,
    an address generator in alternate communication with said pair of RAMs,
    a bank switch unit in communication with said pair of RAMs for switching communication of each RAM of said pair of RAMs alternately with said at least one first interface, said address generator and said second interface,
    a clock in communication with said bank switch unit for providing a frame synch clock signal to said bank switch unit whereby upon each frame boundary said pair of RAMs will be switched; a failure detector in communication with said second interface to determine if data sent from said second interface is data received from one of said RAMs; and a clock failure detector with said clock for determining if said clock has a failure.

2. A time division multiplex chip for use in a voice processing system comprising:
    a pair of first interfaces,
    a pair of RAMs in alternate individual, selective communication with said pair of first interfaces,
    an arbitration unit in communication with said pair of first interfaces to control which of said interfaces is to communicate with RAMs,
    a second interface in alternate individual selective communication with said pair of RAMs,
    a bank switching unit in communication with said pair of RAMs for switching communication of each of said RAMs between said pair of first interfaces and second interface, and
    a clock in communication with said arbitration unit and with said bank switching unit for providing a frame synch clock signal to said bank switching unit whereby upon each frame boundary said pair of RAMs switch communication between said first pair of interface and said second interface and a second pair of first interfaces each of which is in individual selective communication with said pair of RAMs, a second arbitration unit in communication with said clock and with said second pair of first interfaces for controlling which of said second pair of first interfaces is to be in communication with one or the other of said RAMs.

3. The time division multiplexer chip of claim 2 further including a time slot address generator in communication with said pair of RAMs and with said clock.

4. The time division multiplexer chip of claim 2 further comprising an interrupt unit in communication with said time slot address generator.

5. The time division multiplexor chip of claim 4 further comprising a failure detector in communication with said second interface to determine if data sent from said second interface is the same data received by said second interface from one of said RAMs.

6. A method of processing voice data, the steps comprising:
    a. transmitting first voice data to a first interface,
    b. connecting the first interface with a first RAM,
    c. transferring said first voice data from said first interface to said first RAM, includes transferring said first voice data from a time division multiplexer bus to said first interface d. transmitting second voice data to a second interface,
e. connecting said second interface to a second RAM,
f. transferring said second voice data from said second interface to said second RAM includes transferring second voice data from a signal processor to said second interface,
g. discontinuing connection between said first interface and said first RAM,
h. discontinuing connection between said second interface and said second RAM,
I. connecting said first interface to said second RAM,
j. transferring second voice data from said second RAM to said first interface,
k. outputting second voice data from said first interface,
l. transmitting third voice data to said first interface,
m. connecting said second interface with said first RAM,
n. transferring first voice data from said first RAM to said second interface,
o. outputting first voice data from said second interface, and
p. transmitting fourth voice data to said second interface, wherein a failure detector in communication with said second interface to determine if data sent from said second interface is data received from one of said RAMs.

7. The method of claim 6 further including the step of determining if the data output from said first interface is the same as the data received by said first interface from said second RAM.

8. The method of claim 6 wherein the step outputting second voice data from said first interface includes transferring said second voice data to a time division multiplexer bus and the step of outputting first voice data from said second interface includes outputting said first voice data to a signal processor.

* * * * *